United States Patent [19]

Skoultchi et al.

[11] Patent Number: 5,106,928
[45] Date of Patent: Apr. 21, 1992

[54] ACRYLIC ADHESIVE COMPOSITION AND ORGANOBORON INITIATOR SYSTEM

[75] Inventors: Martin M. Skoultchi, Somerset; Nicholas V. Merlo, Edison, both of N.J.

[73] Assignee: National Starch and Chemical Investment Holding Corporation, Wilmington, Del.

[21] Appl. No.: 692,766

[22] Filed: Apr. 29, 1991

[51] Int. Cl.[5] .......................... C08F 4/52; C08F 20/10; C08F 220/18; C07F 5/02; B32B 27/00

[52] U.S. Cl. .................................. 526/196; 526/328; 526/329.1; 564/9; 428/500

[58] Field of Search .............................. 526/134, 196

[56] References Cited

U.S. PATENT DOCUMENTS 3,275,611  9/1966  Mottus et al. ........................ 260/80.5

OTHER PUBLICATIONS

S. Fujisawa et al., Chem. Abstracts 88532r, vol. 73 (1970).

Primary Examiner—Joseph L. Schofer
Assistant Examiner—Wu C. Cheng
Attorney, Agent, or Firm—Eugene Zagarella, Jr; Edwin M. Szala

[57] ABSTRACT

A two-part initiator system useful in acrylic adhesive compositions comprising in one-part a stable organoboron amine complex and in the second part an organic acid destabilizer or activator. This initiator is particularly useful in elastomeric acrylic adhesive compositions and provides a fast, room temperature cure with good stability and exhibiting both high tensile strength and high peel strength.

14 Claims, No Drawings

ACRYLIC ADHESIVE COMPOSITION AND ORGANOBORON INITIATOR SYSTEM

BACKGROUND OF THE INVENTION

This invention relates to a novel organoboron complex initiator system and an acrylic adhesive composition containing this initiator. More particularly this invention involves a two-part initiator system comprising in one-part a stable organoboron amine complex and in the second part an organic acid destabilizer or activator. This initiator system is especially useful in elastomeric acrylic adhesive compositions.

Adhesive compositions including acrylic adhesives such as solutions of elastomeric polymers in soluble polymerizable acrylic or methacrylic monomers are well known in the art. These compositions which are especially known for their toughening properties generally include a redox system which comprises a catalyst or initiator, an accelerator and an activator to initiate cure, as well as other additives such as adhesion promoters, chelators, cross-linking agents, thickeners and plasticizers. Two-part acrylic adhesives where an activator is added as a separate second component are widely used and are known for curing speed as well as toughness. The catalyst or initiator typically used in these adhesives are free-radical initiators of the organic peroxy or hydroperoxy type, perester or peracid type.

Many known adhesive systems, such as the epoxies, require a thermal cure to obtain desirable properties, while others that do not, usually require prolonged cure times. In comparison, the adhesive composition with organoboron amine complex initiator of this invention cures at room temperature and reaches high tensile strength in a short period of time. Additionally, the adhesive composition of this invention has shown exceptional stability on ageing while exhibiting both high tensile strength and high peel strength.

SUMMARY OF THE INVENTION

This invention involves a novel two-part organoboron amine complex initiating system useful in elastomeric acrylic adhesives compositions to provide better and aster room temperature curing thereof.

The organoboron initiating system of this invention is a two-part system comprising:

A) a stabilizing organoboron amine complex of the formula:

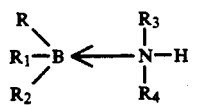   (I)

where R, $R_1$ and $R_2$ are alkyl or 1 to 10 carbon atoms or phenyl, $R_3$ and $R_4$ are hydrogen or alkyl of 1 to 10 carbon atoms, or

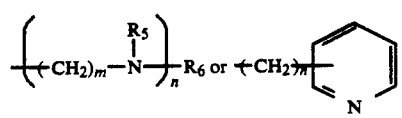

where $R_5$ and $R_6$ are hydrogen or alkyl of 1 to 10 carbon atoms, m is 2 to 10 and n is 1 to 6, and B) an organic acid activator having the formula:

R—COOH where R is hydrogen, alkyl or alkenyl of 1 to 8 carbon atoms, or aryl having 6 to 10 carbon atoms.

DETAILED DESCRIPTION OF THE INVENTION

The stabilized organoboron amine complex of the structure (I) which comprises one part of the initiator of this invention is made by combining an organoboron compound with a primary or secondary amine or polyamine containing primary or secondary amines. The organoboron compound has the formula:

where R, $R_1$ and $R_2$ are alkyl or 1 to 10 carbon atoms or phenyl, preferably alkyl of 1 to 4 carbons. In this formula, the alkyl groups may be straight or branch chained and the phenyl group may contain substituents such as alkyl, alkoxy or halogen. Illustrative compounds of this type include, e.g., trimethylboron, triethylboron, tri-n-butylboron, tri-sec-butylboron and tri-isobutylboron.

The amine which is used in forming the organoboron amine complex (I) may be any primary or secondary amine or polyamine containing a primary or secondary amine, or ammonia and having the following formula:

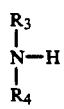

where $R_3$ and $R_4$ are hydrogen or alkyl of 1 to 10 carbon atoms, or

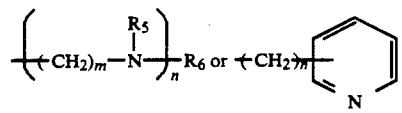

where $R_5$ and $R_6$ are hydrogen or alkyl of 1 to 10 carbon atoms, m is 2 to 10, and n is 1 to 6. The alkyl groups in this formula may be straight or branched chained. Preferably, the R groups noted in the amine will be hydrogen or alkyl of 1 to 4 carbon atoms, m will be 2 to 6 and more preferably 2 to 3 and n will be 1 to 2. Illustrative compounds of this type include, e.g., n-octylamine, 1,6-diaminohexane, diethylamine, dibutylamine, diethylene triamine, dipropylene diamine, ammonia, 1,3-propylenediamine and 1,2-propylenediamine.

The stabilized amine complex can be prepared by combining a solution of the organoboron with the amine under an inert atmosphere with cooling as needed.

The activator used as the second part or component of the initiator system will be a compound which will destabilize or liberate the free organoboron compound by removing the amine group and thereby allow it to initiate the polymerization process. This activator is an organic acid having the formula:

R—COOH where R is H, alkyl or alkenyl of 1 to 8 and preferably 1 to 4 carbon atoms, or aryl of 6 to 10, preferably 6 to 8 carbon atoms. It is further understood that the alkyl or alkenyl group of this organic acid may be straight or branch chained and the aryl may contain substituents such as alkyl, alkoxy or halogen. Illustrative examples of compounds of this type include: acrylic acid, methacrylic acid, benzoic acid, and p-methoxybenzoic acid.

Generally the initiator system of this invention will comprise the organoboron amine complex and an effective destablizing amount of the organic acid activator. More particularly from about 0.1:1 to 200:1 parts by weight of acid to amine complex and preferably from about 1:1 to 24:1 parts by weight of acid to amine complex may be used.

The organoboron initiator of this invention is particularly useful in acrylic adhesive compositions and especially of elastomeric or rubber polymers in compatible polymerizable acrylic monomers.

The polymerizable acrylic monomer may be monofunctional, polyfunctional or a combination thereof.

One class of polymerizable monomers useful in the present compositions correspond to the general formula:

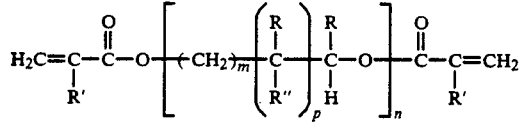

wherein R is selected from the group consisting of hydrogen methyl, ethyl,

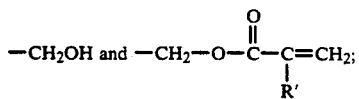

R' is selected from the group consisting of chlorine, methyl and ethyl;

R" is selected from the group consisting of hydrogen, hydroxy, and

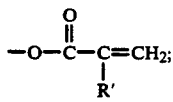

m in an integer equal to at least 1, e.g., from 1 to 8 or higher and preferably from 1 to 4 inclusive;

n is an integer equal to at least 1, e.g., from 1 to 20 or more; and p is one of the following: 0 or 1.

Monomers useful in this invention and which come within the above general formula include, for example, ethylene glycol dimethacrylate, ethylene glycol diacrylate, polyethylene glycol diacrylate, tetraethylene glycol dimethacrylate, diglycerol diacrylate, diethylene glycol dimethacrylate, pentaerythritol triacrylate, trimethylopropane trimethacrylate, and other polyether diacrylates and dimethacrylates.

The above class of monomers is in essence descried in U.S. Pat. No. 3,043,820 issued July 10, 1962 (to R. H. Krieble).

A second class of polymerizable monomers useful in the present compositions correspond to the general formula:

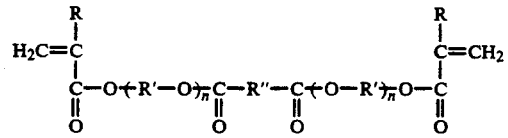

wherein R represents hydrogen, chlorine, methyl or ethyl; R' represents alkylene with 2-6 carbon atoms; and, R" represents $(CH_2)_m$ in which m is an integer of from 0 to 8, or

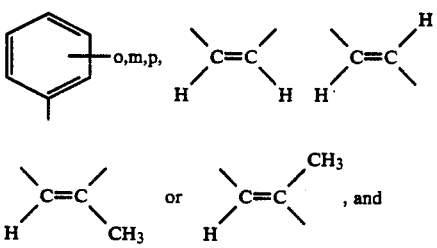

n represents an integer of from 1 to 4.

Typical monomers of this class include, for example, dimethacrylate of bis(ethylene glycol) adipate, dimethacrylate of bis(ethylene glycol) maleate, dimethacrylate of bis(eithylene glycol) phthalate, dimethacrylate of bis(tetraethylene glycol) phthalate, dimethacrylate of bis(tetraethylene glycol) sebacate, dimethacrylates of bis(tetraethylene glycol) maleate, and the diacrylates and chloroacrylates corresponding to said dimethacrylates, and the like.

The above class of monomers is in essence described in U.S. Pat. No. 3,457,212 issued July 22, 1969 (Sumitome Chemical Company, Ltd.)

Also useful herein are monomers which are isocyanate-hydroxyacrylate or isocyanate-aminoacrylate reaction products which may be characterized as acrylate terminated polyurethanes and polyureides or polyureas. These monomers correspond to the general formula:

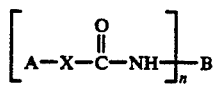

wherein X is selected from the group consisting of —O— and

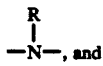

R is a member selected from the group consisting of hydrogen and lower alkyl of 1 to 7 carbon atoms; A represents the organic residue of an active hydrogen containing acrylic ester wherein the active hydrogen has been removed, the ester being hydroxy or amino substituted on the alkyl portion thereof and the methyl, ethyl and chlorine homologs thereof; n is an integer from 1 to 6 inclusive; and B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocylic radicals both substituted and unsubstituted.

Typical monomers of this class include the reaction product of mono- or polyisocyanate, for example, toluene diisocyanate, with an acrylate ester containing a hydroxy or amino group in the non-acrylate portion thereof, for example, hydroxyethyl methacrylate.

The above class of monomers is in essence described in U.S. Pat. No. 3,426,988 issued Feb. 4, 1969 (Loctite Corporation).

Another class of monomers useful in the present application are the mono- and polyacrylate and methacrylate esters of bisphenol type compounds. These monomers may be described by the formula:

where $R^1$ is methyl, ethyl, carboxyalkyl or hydrogen; $R^2$ is hydrogen, methyl or ethyl; $R^3$ is hydrogen, methyl or hydroxyl; $R^4$ is hydrogen, chlorine, methyl or ethyl, and n is an integer having a value of 0 to 8.

Representative monomers of the above-described class include: dimethacrylate and diacrylate esters of 4,4'-bis-hydroxyethoxy-bisphenol A; dimethacrylate and diacrylate esters of bisphenol A; etc. These monomers are essentially described in Japanese Patent Publication No. 70-15640 (to Toho Chemical Manuf. Ltd.).

In addition to the monomers already described, other useful monomers are monofunctional acrylate and methacrylate esters and the substituted derivatives thereof such as hydroxy, amide, cyano, chloro, and silane derivatives. Such monomers include, for example, methyl acrylate, methyl methacrylate, ethyl acrylate, ethyl methacrylate, isobornyl methacrylate, hydroxyethyl methacrylate, hydroxypropyl acrylate, hydroxypropyl methacrylate, butyl acrylate, n-octyl acrylate, 2-ethylhexyl acrylate, 2-ethylhexyl methacrylate, decylmethacrylate, dodecyl methacrylate, cyclohexyl methacrylate, tert-butyl methacrylate, acrylamide, N-methyloacrylamide, diacetone acrylamide, N-tert-butyl acrylamide, N-tert-octyl acrylamide, N-butoxyacrylamide, gamma-methacryloxypropyl trimethoxysilane, 2-cyanoethyl acrylate, 3-cyanopropyl acrylate, tetrahydrofurfuryl methacrylate, tetrahydrofurfuryl chloroacrylate, glycidyl acrylate, glycidyl methacrylate, and the like.

The monomers useful herein are seen to be polymerizable monomers having one or more acrylic or substituted acrylic groups as a common, unifying characteristic, and for convenience may be generically termed acrylic monomers.

The elastomer of rubber polymer may be any of the typically available synthetic rubbers that are soluble in the monomer such as those based on polyisoprenes, polybutadienes, polyolefins, polyurethane, polyesters, etc. Examples of elastomeric materials include homopolymers such as polybutadiene, polyisoprene and polyisobutylene; diene type copolymers such as butadiene/styrene copolymer, butadiene/acrylonitrile copolymer, butadiene/methyl methacrylate copolymer and butadiene/alkyl acrylate copolymer; ethylene/vinyl acetate copolymers; ethylene/alkyl acrylate copolymers (1-8 carbons in the alkyl group), rubbery polyalkyl acrylates or copolymers thereof; polyurethane; chlorinated polyethylenes; and EPDM (ethylene/propylene/diene terpolymers).

The elastomers of these structures may contain a functional group at one or both ends or within a particular segment or repeating unit of the copolymer. Among the suitable functional groups are vinyl, epoxy, carboxyalkyl, and mercapto groups. Other functional groups may be employed as deemed useful as determined by routine experimentation.

One preferred group of elastomers are the block copolymers. Several such block copolymers are manufactured by Shell Chemical Company under the tradename Kraton and by Firestone under the tradename Stereon. In particular, Stereon 840A, a poly(styrene-b-butadiene-b-styrene) block copolymer, has been found to be especially useful in the instant adhesive composition. Other preferred block copolymers of this type are available under the tradename Solprene 416, manufactured by Phillips Petroleum Co.

The monomer solution containing the elastomer or rubbery polymer is commonly prepared by dissolving the elastomer in the monomer, which may be in the form of a syrup. In some cases, the monomer solution may be prepared by extracting a rubber polymer from a latex of the rubber polymer in water, as used for suspension polymerization, and then dissolving in the monomer.

The amount of the acrylic monomer to be used in this invention may vary somewhat depending on the specific properties desired but generally about 10 to 90% by weight of the composition and preferably about 15 to 80% by weight is used. Adjustment within these ranges are easily made within the skill of the art. The elastomer is generally present in amounts of about 5 to 80% by weight and preferably about 20 to 60% by weight of the composition.

The second part of the initiator which contains the acid activator, preferably may also contain a peroxy or hydroperoxy component having the formula:

R—OOH where R is hydrogen, alkyl of 1 to 10 preferably 4 to 10 carbon atoms or aryl or alkaryl of 6 to 14, preferably 6 to 10 carbon atoms. Illustrative compounds of this type are t-butyl hydroperoxide and cumene hydroperoxide. Typically these hydroperoxy compounds which aid in the initiation of polymerization are used in the initiator system in amounts of about 0.2:1 to 100:1 and preferably from about 0.4:1 to 20:1 parts by weight of hydroperoxy to amine complex.

The organoboron amine complex used in an adhesive composition in accordance with this invention generally comprises from about 0.1 to 5% by weight of the total composition and preferably from about 0.5 to 2.5% and the organic acid activator comprises from about 0.5 to 20%, preferably from about 1 to 12% by weight of the total composition. When a hydroperoxy compound is used in the adhesive composition, it generally comprises from about 0.2 to 10% by weight of the total composition and preferably from about 0.5 to 2%.

Other adhesives useful in elastomeric acrylic adhesives of this type, such as adhesion promoters, chelators, cross-linking agents, inhibitors, activators such as N,N-dimethyltoluidine as well as thickeners, plasticizers and diluents may also be used in the adhesive compositions of this invention.

The organoboron initiator system as described above comprises a two component system. When used in the acrylic rubber compositions of this invention generally the two parts are mixed in equal quantities of the nomomer-polymer solution, but this may vary at the discretion of the user. That is, the stabilized organoboron compound is added to a solution of the elastomer or rubber polymer dissolved in the polymerizable acrylic monomer and the organo acid activator and optional hydroperoxy compound are added as a second part which also may be in a solution of the rubber polymer in acrylic monomer.

Adhesive compositions of this invention are particularly useful in structural and semi-structural applications such as speaker magnets, metal-metal bonding (automotive) glass-metal bonding, glass-glass bonding, circuit board component bonding, selected plastic to metal, glass, wood, etc. and electric motor magnets.

In the following examples, which are merely illustrative of the embodiments of this invention, all parts and percentages are given by weight and all temperatures are in degrees Celsius unless otherwise noted.

EXAMPLE I

Preparation of Organoboron Amine Complexes

Into a 3-neck flask containing a stirrer, condenser, thermometer and a nitrogen purge, 11.1 g (0.15 m, 50% excess) of 1,3-propylene diamine was added and the nitrogen purge continued while 100 ml of 1 molar solution (0.1 m) of tributylboron in tetrahydrofuran was further added. A mile exotherm developed and the temperature was kept below about 40° C. by cooling as necessary. When the addition was complete, the mixture was stirred for about 0.5 hour and transferred to a bottle previously flushed with nitrogen. This amine complex is identified below as initiator XII as well as other amine complexes prepared in a similar manner using the amines and amounts indicated.

| AMINE | AMOUNT | INITIATOR NO. |
|---|---|---|
| ethylene diamine | 6.0 g (0.10 m) | I |
| ethylene diamine | 9.0 g (0.15 m) | II |
| ethylene diamine | 12.0 g (0.20 m) | III |
| 1,2-propylene diamine | 11.1 g (0.15 m) | IV |
| n-octylamine | 19.4 g (0.15 m) | V |
| 1,6-diaminohexane | 17.4 g (0.15 m) | VI |
| diethylenetriamine | 10.3 g (0.10 m) | VII |
| 1,3-propylene diamine[1] | 7.4 g (0.10 m) | VIII |
| 4-aminomethylpyridine | 10.8 g (0.10 m) | IX |
| 3-aminomethylpyridine | 10.8 g (0.10 m) | X |
| diethylamine | 10.95 g (0.15 m) | XI |
| 1,3-propylene diamine | 11.1 g (0.15 m) | XII |

[1] 1 molar solution of triethylboron in tetrahydrofuran used

EXAMPLE II

Preparation of Adhesive Composition

An adhesive formulation was prepared consisting of two parts that were mixed just prior to use. The first part contained the monomer-polymer syrup and the stabilized organoboron amine complex initiator from Example I. The second part contained a similar monomer-polymer syrup and an acid activator or reagent that destabilized the organoboron amine complex liberating the free organoboron. When mixed with the first part polymerization was initiated. The two adhesive composition parts were:

| Part I | |
|---|---|
| Stereon 840A (styrene-butadiene block copolymer) | 30 parts |
| Isobornyl methacrylate | 70 parts |
| Organoboron amine initiator No. 12[1] | 4 parts |
| Part II | |
| Stereon 840A | 30 parts |
| Isobornyl methacrylate | 61 parts |
| Methacrylic acid | 5 parts |
| Cumene hydroperoxide (CHP) | 4 parts |

[1] 1 molar solution in tetrahydrofuran

Approximately equal portions of Parts I and II were mixed and applied to steel plates and allowed to cure. Tensile shear strength measurement on the adhesive bond was made according to the ASTM standard method D1002-72(1973) and found to be 2000 psi.

Additional adhesive formulations were prepared in a similar manner using the components as identified below along with the resulting tensile strength determined is described above for the formed adhesive bond.

| RUBBER (%) | INITIATOR (%) | % ACID[1] | % CHP[2] | BOND TENSILE STRENGTH PSI |
|---|---|---|---|---|
| Stereon 840a (20) | XII (0.5) | 10 | 0.1 | 1875 |
| Steroen 840a (25) | VIII (0.5) | 1 | 1 | 1550 |
| Kraton 1107 (20)[3] | II (0.5) | 10 | 1 | 1850 |
| Kraton 1107 (20) | II (0.25) | 10 | 1 | 1350 |
| Kraton 1107 (20) | II (1.0) | 10 | 1 | 2100 |
| Hycar 4051 (10)[4] | IV (0.5) | 10 | 1 | 1200 |
| Kraton 1122 (25)[5] | VI (0.5) | 1 | 1 | 1500 |
| Stereon 840A (20) | I (0.5) | 0.5 | 1.7 | 1500 |
| | also contains 13% octyl acrylate | | | |
| Stereon 840A (30) | VIII (0.5) | 10 | 1 | 2700 |
| | monomer was tetrahydrofurfuryl methacrylate | | | |

[1] methacrylic acid
[2] cumene hydroperoxide
[3] styrene-isoprene
[4] polyacrylic rubber polymer
[5] styrene-isoprene

EXAMPLE III

Similar adhesive formulations were prepared as in Example II using an amine complex of 1,3 propylene diamine and triethyl boron as the initiator (initiator No. VIII). The formulations contained two-parts as in Example II that were mixed just prior to use and had the following compositions:

Part I

| Sample No. | Initiator | Rubber[1] | Monomer A | Monomer B | Monomer C |
|---|---|---|---|---|---|
| 3A-I | 2 parts | 25 parts | 60 parts (IBOMA) | 15 parts (OMA) | — |
| 3B-I | 2 parts | 25 parts | 60 parts (IBOMA) | 15 parts (OMA) | — |
| 3C-I | 2 parts | 25 parts | 60 parts (IBOMA) | 15 parts (ODA) | — |
| 3D-I | 2 parts | 25 parts | 60 parts (IBOMA) | 15 parts (HDDA) | — |
| 3E-I | 2 parts | 25 parts | 60 parts (IBOMA) | 15 parts (HDDMA) | — |
| 3F-I | 2 parts | 30 parts | — | — | 70 parts (THFMA) |
| 3G-I | 2 parts | 30 parts | — | — | 70 parts (THFMA) |
| 3H-I | 2 parts | 30 parts | — | — | 70 parts (THFMA) |
| 3I-I | 2 parts | 30 parts | — | — | 70 parts (THFMA) |
| 3J-I | 2 parts | 30 parts | 55 parts (IBOMA) | — | 15 parts (HPMA) |

Part II

| Sample No. | Rubber[1] | Monomer A | Monomer B | Acid | CHP |
|---|---|---|---|---|---|
| 3A-II | 25 parts | 50 parts (THFMA) | 15 parts (OMA) | 10 parts (MAA) | — |
| 3B-II | 25 parts | 50 parts (IBOMA) | 15 parts (OMA) | 10 parts (MAA) | — |
| 3C-II | 25 parts | 50 parts (THFMA) | 15 parts (ODA) | 10 parts (MAA) | — |
| 3D-II | 25 parts | 50 parts (THFMA) | 15 parts (HDDA) | 10 parts (MAA) | — |
| 3E-II | 25 parts | 50 parts (THFMA) | 15 parts (HDDMA) | 10 parts (MAA) | — |
| 3F-II | 30 parts | 60 parts (THFMA) | — | 10 parts (MAA) | 0.125 parts |
| 3G-II | 30 parts | 60 parts (THFMA) | — | 10 parts (MAA) | 0.250 parts |
| 3H-II | 30 parts | 60 parts (THFMA) | — | 10 parts (MAA) | 0.5 parts |
| 3I-II | 30 parts | 60 parts (THFMA) | — | 10 parts (MAA) | 1 part |
| 3J-II | 30 parts | 55 parts (THFMA) | 15 parts (HPMA) | 1 part (MAA) | — |

[1]Stereon 840A
IBOMA — isobornyl methacrylate
OMA — 2-ethylhexyl methacrylate
ODA — n-octylacrylate/n-decylacrylate mixture
HDDA — 1,6-hexanediol diacrylate
HDDMA — 1,6-hexanediol dimethacrylate
THFMA — tetrahydrofurfryl methacrylate
HPMA — 2-hydroxypropyl methacrylate
MAA — methacrylic acid
CHP — cumene hydroperoxide Approximately equal portions of Parts I and II were applied to steel plates and allowed to cure at room temperature. The bonds were evaluated for tensile shear strength using ASTM standard method D1002-72 (1973) in pounds/inch$^2$(psi) and for T-peel using ASTM standard method D1876-72 in pounds/linear inch (pli). These results are shown below (where, e.g., 3A is 3AI+3AII).

| Adhesive Sample No. | Tensile Shear (psi) | T-Peel (pli) |
|---|---|---|
| 3A | 2500 | 20 |
| 3B | 1700 | 8 |
| 3C | 2400 | 14 |
| 3D | 2700 | 6 |
| 3E | 2900 | 5 |
| 3F | 1875 | — |
| 3G | 2600 | — |
| 3H | 2000 | — |
| 3I | 2600 | — |
| 3J | 1800 | 4 |

What is claimed is:
1. A curable two-part adhesive composition wherein one-part comprises a polymerizable acrylic monomer and an effective amount of a stabilized organoboron amine complex initiator of the formula:

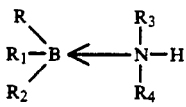

where R, $R_1$ and $R_2$ are alkyl of 1 to 10 carbon atoms or phenyl, $R_3$ and $R_4$ are hydrogen or alkyl of 1 to 10 carbon atoms, or

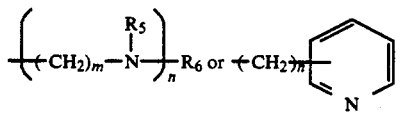

where $R_5$ and $R_6$ are hydrogen or alkyl of 1 to 10 carbon atoms, m is 2 to 10 and n is 1 to 6; and the second part contains an effective destablizing amount of an organic acid activator having the formula:

R—COOOH where R is H, alkyl or alkenyl of 1 to 8 carbons or aryl of 6 to 14 carbon atoms.

2. The composition of claim 1 wherein in the organoboron amine complex R, $R_1$ and $R_2$ are alkyl of 1 to 4 carbons, $R_3$, $R_4$ and $R_5$ are hydrogen or alkyl of 1 to 4 carbons, $R_6$ is hydrogen, m is 2 to 6 and n is 1 to 2.

3. The composition of claim 2 wherein the R group of the organic acid activator is an alkyl or alkenyl group of 1 to 4 carbons or an aryl of 6 to 8 carbons.

4. The composition of claim 3 wherein from about 0.1:1 to 200:1 parts by weight of acid to amine complex are used.

5. The composition of claim 4 wherein the second part of the initiator system also contain a hydroperoxy compound.

6. The adhesive composition of claim 1 wherein the first part of the composition containing the acrylic monomer further comprises a rubber polymer.

7. The adhesive composition of claim 6 wherein the second part containing an organic acid activator further comprises a polymerizable acrylic monomer with a rubber polymer dissolved therein.

8. The composition of claim 6 wherein in the organoboron amine complex R, $R_1$, and $R_2$ are alkyl of 1 to 4 carbons, $R_3$, $R_4$ and $R_5$ are each hydrogen or alkyl of 1 to 4 carbon atoms, $R_6$ is hydrogen, m is 2 to 6 and n is 1 to 2.

9. The composition of claim 8 wherein the R group of the organic acid activator is an alkyl or alkenyl group of 1 to 4 carbons or an aryl of 6 to 8 carbons.

10. The composition of claim 9 wherein from about 0.1 to 5% by weight of the organoboron amine complex and from about 0.5 to 20% by weight of the organic acid activator based on the total weight of the composition are used.

11. The composition of claim 10 wherein the second part further contains a hydroperoxy compound having the formula R—OOH, where R is hydrogen, alkyl of 1 to 10 carbon atoms or aryl or alkaryl of 6 to 14 carbon atoms.

12. The composition of claim 10 wherein from about 10 to 90% by weight of the acrylic monomer and from about 5 to 80% by weight of the rubber polymer based on the total weight of the composition are used.

13. The composition of claim 12 wherein the acrylic monomer is an alkyl acrylate or methacrylate and the rubber polymer is a polymer, copolymer or block copolymer or polybutadiene, polyisoprene, polyisobutylene, butadiene/styrene, butadiene/acrylonitrile and butadiene/alkyl acrylate.

14. The composition of claim 13 wherein the second part further comprises hydroperoxy compound having the formula R—OOH, where R is hydrogen, alkyl of 1 to 10 carbon atoms or aryl or alkaryl of 6 to 14 carbon atoms.

* * * * *